(12) United States Patent
Abali et al.

(10) Patent No.: US 11,668,117 B2
(45) Date of Patent: Jun. 6, 2023

(54) OPTO-ELECTRONIC LOCKING ASSEMBLY FOR ELECTRONIC GAMING MACHINES

(71) Applicant: Aristocrat Technologies Australia Pty Limited, North Ryde (AU)

(72) Inventors: Muharrem Abali, Meadowbank (AU); Calvin Kim, Baulkham Hills (AU); Jeffrey Skeen, Cherrybrook (AU); Deepak Chaudhari, North Parramatta (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 279 days.

(21) Appl. No.: 17/015,854

(22) Filed: Sep. 9, 2020

(65) Prior Publication Data
US 2022/0074232 A1    Mar. 10, 2022

(51) Int. Cl.
*E05B 41/00* (2006.01)
*G07F 17/32* (2006.01)
*E05C 3/16* (2006.01)
*H04Q 11/00* (2006.01)

(52) U.S. Cl.
CPC ............ *E05B 41/00* (2013.01); *E05C 3/16* (2013.01); *G07F 17/3216* (2013.01); *G07F 17/3241* (2013.01); *E05Y 2201/654* (2013.01); *E05Y 2400/445* (2013.01); *E05Y 2900/606* (2013.01); *H04Q 11/0005* (2013.01)

(58) Field of Classification Search
None
See application file for complete search history.

(56) References Cited

U.S. PATENT DOCUMENTS

| | | | |
|---|---|---|---|
| 4,795,155 A | 1/1989 | Grande | |
| 5,392,025 A * | 2/1995 | Figh | G08B 13/14 70/264 |
| 7,553,237 B2 * | 6/2009 | Rodriguez | G07F 17/3216 70/264 |
| 7,758,428 B2 * | 7/2010 | Mattice | G07F 17/3216 70/264 |
| 8,616,982 B2 * | 12/2013 | Greenberg | G07F 17/3202 312/107 |
| 2002/0142831 A1 * | 10/2002 | Mattice | G07F 17/32 463/29 |
| 2006/0012184 A1 | 1/2006 | Ottesen | |

* cited by examiner

*Primary Examiner* — Sunit Pandya
(74) *Attorney, Agent, or Firm* — McAndrews, Held & Malloy, Ltd.

(57) ABSTRACT

An electronic gaming machine including a cabinet defining an interior space. The electronic gaming machine also includes a door releasably fastened to the cabinet operable to move between a locked state preventing access to the interior space and an unlocked state permitting access to at least a portion of the interior space. A security housing comprising a locking assembly and an optical switch coupled to a processor. The locking assembly includes an actuator defining a channel. The optical switch comprises a transmitter and a receiver. When the door engages the locking assembly, the actuator is operable to move the channel to align with the transmitter and the receiver to form an optical path between the transmitter and the receiver through the channel and the optical switch is operable to communicate the locked state to at least one of the processor, the server computer, and the gaming system.

20 Claims, 17 Drawing Sheets

OPTO-ELECTRONIC LOCKING ASSEMBLY FOR ELECTRONIC GAMING MACHINES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Any time when an EGM cabinet is opened, e.g., at a door, it posts a security concern. As such, regulations are required and followed to monitor different phrases of opening an EGM cabinet using a logic unit. For example, depending on the type of the door and the jurisdiction, the door must be monitored by a number of different sensors that must be in an agreement.

Conventional EGMs use a mechanical switch in parallel with an optical switch to monitor the state of the main door and the top door. The optical sensor uses a photo diode as a transmitter to transmit an outgoing signal generated by the logic unit through an optical path or optical circuit, and a photo transistor as receiver to receive, capture or relay an incoming signal back to the logic unit, when the optical path is completed. Specifically, the transmitted outgoing signal optically bounces off a prism installed at the door that moves in and out of the optical path completing or breaking the optical circuit. When a mismatch between the outgoing signal and the incoming signal is detected in the optical circuit, an alarm is triggered.

In some cases, since the optical path is divided between different parts of the cabinet, alignments of the prism to the photo diode and the photo transistor may be compromised due to manufacturing tolerances, cabinet structure, minor changes in cabinet geometry due to wear. Further, since the transmitter is typically in close proximity with the receiver, intermittent transmission between the transmitter and the receiver due to secondary optical reflections may occur even if the prism is misaligned with the transmitter or the receiver, which may result in a false positive read that the EGM cabinet has been secured.

Adding a mechanical shutter between the transmitter and the receiver may cause other reliability issues such as occupational safety issues. Both comprised alignments or misfiring between the transmitter and the receiver may cause false alarms and/or lock up of the EGMs, and may further cause stoppage and/or intervention. In other cabinets, shape and location of the optical prism may present a safety concern as well.

SUMMARY

Integrated optical electronic sensing systems, devices, and methods for securing an electronic gaming machine are disclosed. A security housing includes an optical switch including a transmitter and a receiver, and a locking assembly comprising an actuator. The locking assembly and the optical switch are integrated into the security housing. The security housing monitors a position of the locking assembly inside the security housing and switches state when the door is locked. The optical switch may take the form of a C-shaped optical switch that may accept the actuator to form an optical path through a channel, and detect a locked state. The lock position or state of a door may be either a locked position or state or an unlocked position or state.

One aspect of the embodiments discloses an electronic gaming machine including a cabinet defining an interior space. The electronic gaming machine also includes a door releasably fastened to the cabinet operable to move between a locked state preventing access to the interior space and an unlocked state permitting access to at least a portion of the interior space. A security housing comprising a locking assembly and an optical switch coupled to a processor. The locking assembly includes an actuator defining a channel. The optical switch comprises a transmitter and a receiver. When the door engages the locking assembly, the actuator is operable to move the channel to align with the transmitter and the receiver to form an optical path between the transmitter and the receiver through the channel, and the optical switch is operable to communicate to the processor the locked state.

In some embodiments, when the door disengages the locking assembly, the actuator is operable to move the channel to block the optical path between the transmitter and receiver through the channel thereby discontinuing the optical path, and the optical switch is operable to communicate the unlocked state.

In some embodiments, the optical switch is operable to monitor a) an optical path formed between the transmitter and the receiver when the door is in the locked state, and b) a discontinued optical path when the door is in the unlocked state, and to communicate one of the locked state and the unlocked state to the processor based on the optical path formed and/or the discontinued optical path.

In some embodiments, the locking assembly includes a latch, the door includes a striker, wherein the striker engages the latch to secure the door in the locked state.

In some embodiments, when the striker engages the latch, the latch rotates and secures the striker when the door is in the locked state.

In some embodiments, the locking assembly further includes an actuator coupled to the latch.

In some embodiments, the locking assembly defines an opening through which the striker is received.

In other embodiments, a cable coupled to the door. When the door is moving away from the locked position toward the unlocked position, the door is operable to pull the cable and the actuator, and to disengage the striker from the latch, thereby rotating the actuator to discontinue the optical path at the channel.

In some embodiments, when the cable is engaged to move the actuator, the actuator is operable to rotate and optically block the channel.

In yet further embodiments, a spring couples the actuator to the latch, and relays movements between the latch and the actuator.

In some embodiments, the locking assembly includes an actuator that defines a channel, and the optical switch defines a latch access to receive the channel that forms the optical path when the door is in the locked state.

In other embodiments, the locking assembly includes a latch, and the door includes a striker operable to engage the latch when the door is in the locked state. The actuator rotates to disengage the striker when the door is in the unlocked state, thereby optically blocking the channel and discontinuing the optical path.

In some embodiments, the locking assembly further includes a latch rotatably coupled to the actuator, and the door includes a striker. The striker engages the latch, and the latch rotatably actuates the actuator to complete the optical path through the channel when the door is in the locked state.

In other embodiments, the optical switch includes an optical transmitter operable to transmit an optical signal and an optical receiver operable to receive a transmitted signal, the optical transmitter and the optical receiver defining the latch access.

In some embodiments, the optical switch is arranged to position the optical transmitter above and the optical receiver below the actuator, when the actuator is in the closed position.

In yet other embodiments, the optical transmitter, the actuator, and the optical receiver form the optical path via the channel defined by the actuator, when the door is in the locked state.

In some embodiments, the channel is aligned with the optical transmitter and the optical receiver when the door is in the locked state.

In further embodiments, the actuator rotates and optically blocks the optical path from the optical transmitter to the optical receiver when the door moves from the locked state to the unlocked state.

In some embodiments, the channel is not aligned with the optical transmitter and the optical receiver when the door moves from the locked state to the unlocked state.

In some embodiments, the locking assembly is positioned in the cabinet and communicates to the processor that the door is in the unlocked state when the optical path is discontinued.

In some embodiments, the optical transmitter and the optical receiver are integrated into the security housing with tighter tolerances, instead of using multiple discrete components on a PCBA.

In further embodiments, the optical transmitter and the optical receiver monitor a position of a locking cam inside a latch. By monitoring the position of the locking assembly or portions thereof, an accurate lock detection report may be generated regarding whether a door is properly latched or not.

In yet other embodiments, the optical transmitter and the optical receiver are formed within an integral to the cabinet to monitor whether the door has been properly engaged and to reduce or minimize misalignment and/or false alarms. More specifically, the security housing monitors a position of an actuator, which only switches state once the door is properly locked.

An embodiment includes a processor that is coupled to at least one of a server computer and a gaming system. The locking assembly is operable to communicate, to at least one of the processor, the server computer, and the gaming system, that the door is in the locked state when the optical path is formed, and the unlocked state when the optical path is discontinued.

DETAILED DESCRIPTION

When hardware of the EGM needs upgrading, access to circuits in the EGM may be required. However, accessing circuits in the EGM may pose both security and regulatory concerns.

As such, an aspect of the disclosure describes an embodiment of a gaming cabinet that detects whether the EGM is securely locked or remains open or unlocked during and/or after maintenance, upgrading and/or inspection, or for any other reasons. For example, embodiments may include a gaming machine that includes a door and a cabinet defining an interior space. The door may include a striker to engage a security housing positioned in the interior space. When the striker engages the security housing, that is, in a locked position or state, a locking assembly engages the striker and completes an optical path, which is monitored. When the striker disengages the security housing, that is, in an unlocked position or state away from the locked position or state, the locking assembly disengages the striker, and discontinues the optical path, which may be reported as a potential security issue.

Figure 1:
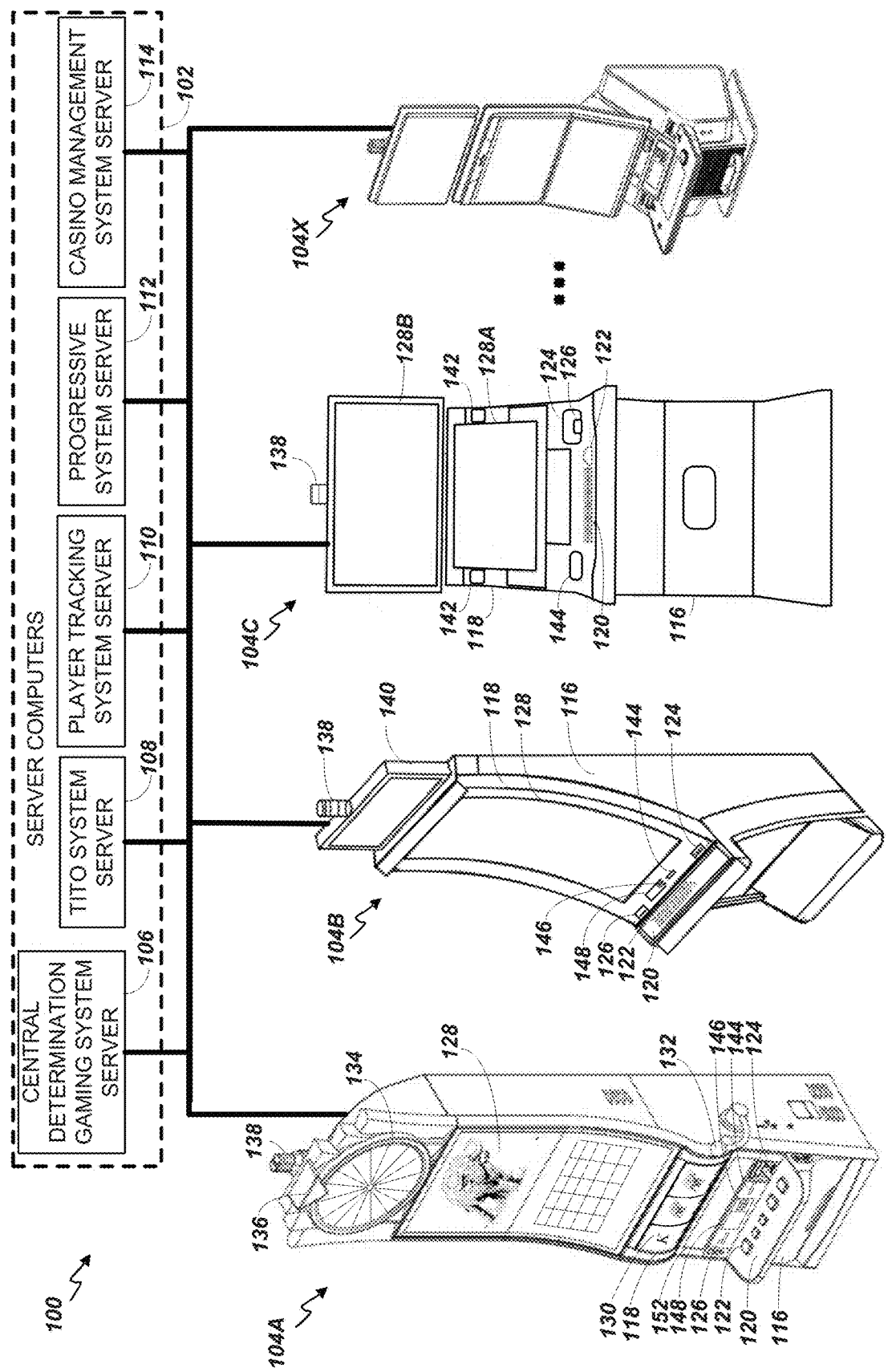
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
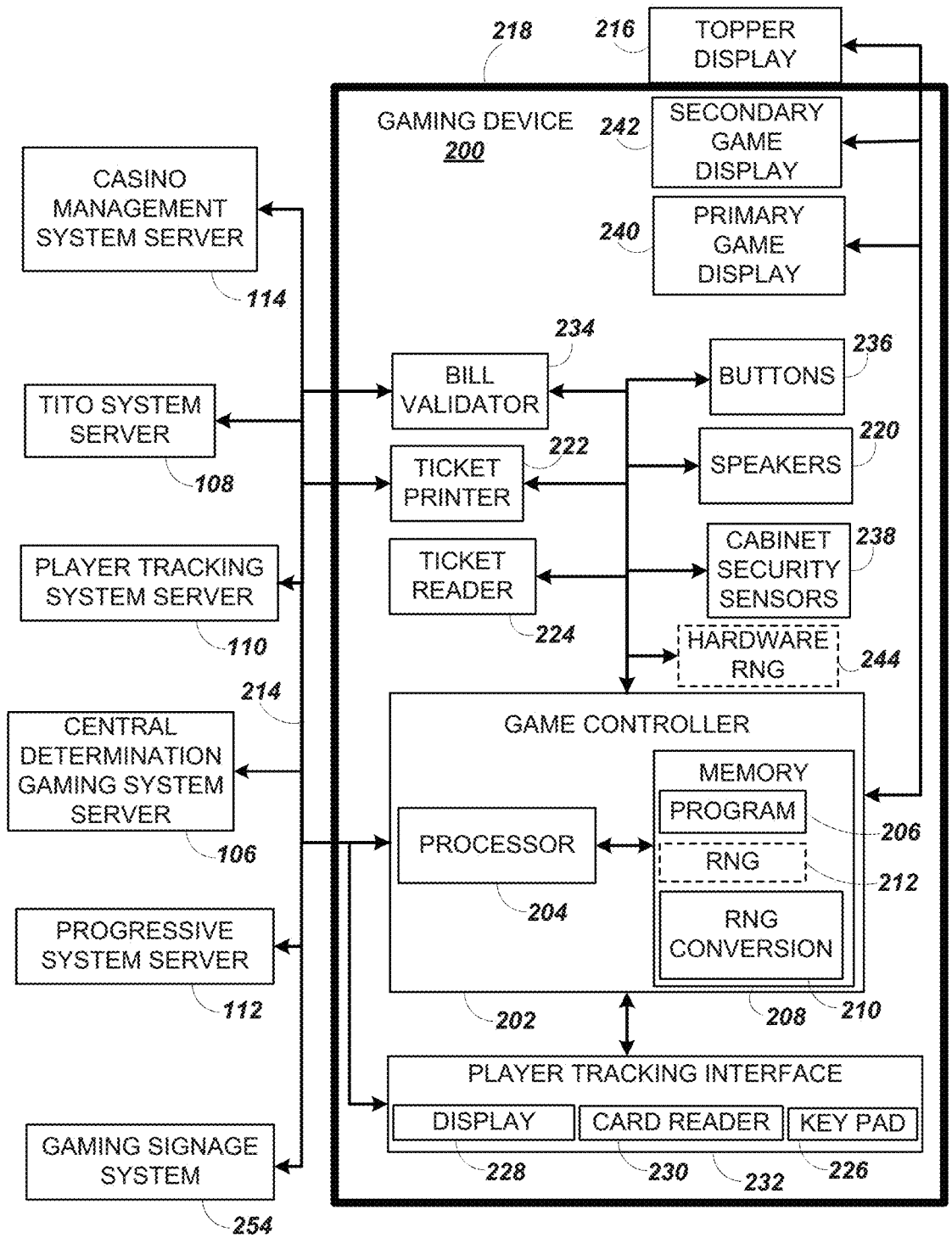
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

In FIG. 1, gaming device 104X is shown as a MarsX™ upright model gaming device manufactured by Aristocrat® Technologies, Inc. As shown, gaming device 104X is embedded with programmable lighting that may change based on game content to engage and attract players. Similar to gaming devices 104A-104C, gaming device 104X may also have multiple gaming display areas. In some cases, gaming device 104X may include removable and replaceable components, and allow for rapid on-the-floor changes.

Many different types of games, including mechanical slot games, video slot games, video poker, video black jack, video pachinko, keno, bingo, and lottery, may be provided with or implemented within the depicted gaming devices 104A-104X and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM.

These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
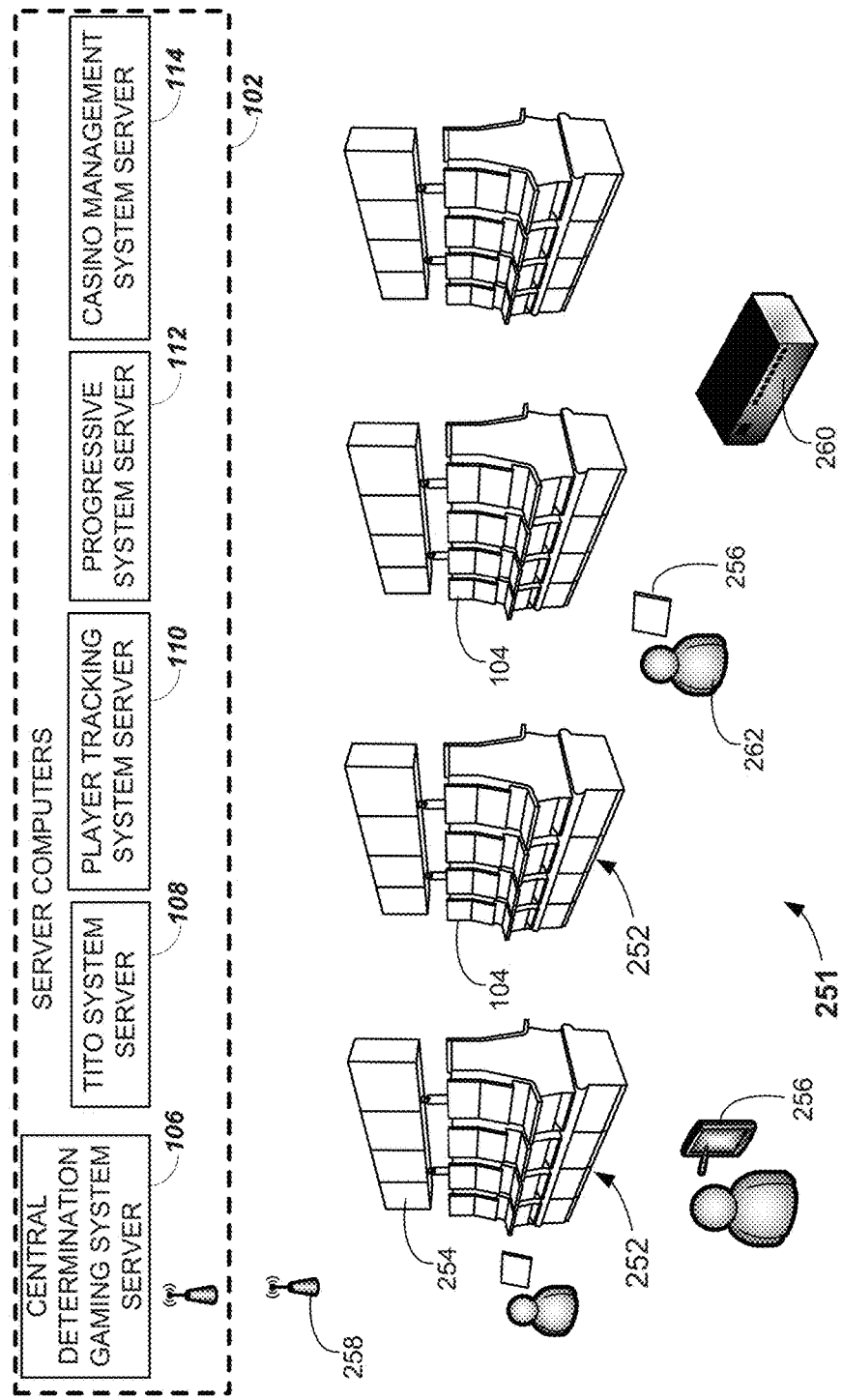
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 3:
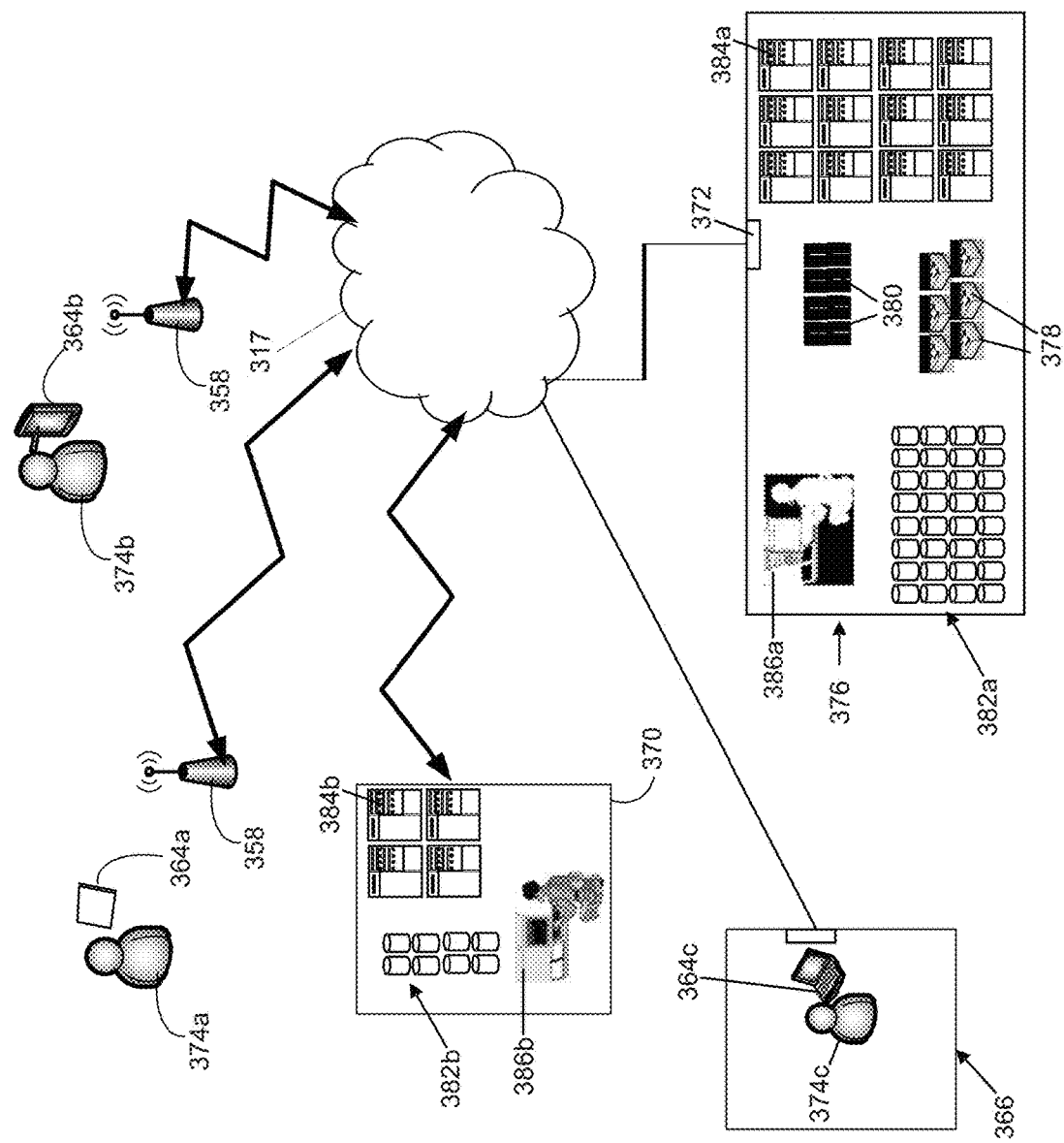
FIG. 3 is a diagram that shows examples of components of a system for providing online gaming according to some aspects of the present disclosure.

FIG. 3 is a diagram that shows examples of components of a system for providing online gaming according to some aspects of the present disclosure. As with other figures presented in this disclosure, the numbers, types and arrangements of gaming devices shown in FIG. 3 are merely shown by way of example. In this example, various gaming devices, including but not limited to end user devices (EUDs) 364a, 364b and 364c are capable of communication via one or more networks 317. The networks 317 may, for example, include one or more cellular telephone networks, the Internet, etc. In this example, the EUDs 364a and 364b are mobile devices: according to this example the EUD 364a is a tablet device and the EUD 364b is a smart phone. In this implementation, the EUD 364c is a laptop computer that is located within a residence 366 at the time depicted in FIG. 3. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 376 includes various devices that are configured to provide online wagering games via the networks 317. The gaming data center 376 is capable of communication with the networks 317 via the gateway 372. In this example, switches 378 and routers 380 are configured to provide network connectivity for devices of the gaming data center 376, including storage devices 382a, servers 384a and one or more workstations 386a. The servers 384a may, for example, be configured to provide access to a library of games for online game play. In some examples, code for executing at least some of the games may initially be stored on one or more of the storage devices 382a. The code may be subsequently loaded onto a server 384a after selection by a player via an EUD and communication of that selection from the EUD via the networks 317. The server 384a onto which code for the selected game has been loaded may provide the game according to selections made by a player and indicated via the player's EUD. In other examples, code for executing at least some of the games may initially be stored on one or more of the servers 384a. Although only one gaming data center 376 is shown in FIG. 3, some implementations may include multiple gaming data centers 376.

In this example, a financial institution data center 370 is also configured for communication via the networks 317. Here, the financial institution data center 370 includes servers 384b, storage devices 382b, and one or more workstations 386b. According to this example, the financial institution data center 370 is configured to maintain financial accounts, such as checking accounts, savings accounts, loan accounts, etc. In some implementations one or more of the authorized users 374a-374c may maintain at least one financial account with the financial institution that is serviced via the financial institution data center 370.

According to some implementations, the gaming data center 376 may be configured to provide online wagering games in which money may be won or lost. According to some such implementations, one or more of the servers 384a may be configured to monitor player credit balances, which may be expressed in game credits, in currency units, or in any other appropriate manner. In some implementations, the server(s) 384a may be configured to obtain financial credits from and/or provide financial credits to one or more financial institutions, according to a player's "cash in" selections, wagering game results and a player's "cash out" instructions. According to some such implementations, the server(s) 384a may be configured to electronically credit or debit the account of a player that is maintained by a financial institution, e.g., an account that is maintained via the financial institution data center 370. The server(s) 384a may, in some examples, be configured to maintain an audit record of such transactions.

In some alternative implementations, the gaming data center 376 may be configured to provide online wagering games for which credits may not be exchanged for cash or the equivalent. In some such examples, players may purchase game credits for online game play, but may not "cash out" for monetary credit after a gaming session. Moreover, although the financial institution data center 370 and the gaming data center 376 include their own servers and storage devices in this example, in some examples the financial institution data center 370 and/or the gaming data center 376 may use offsite "cloud-based" servers and/or storage devices. In some alternative examples, the financial institution data center 370 and/or the gaming data center 376 may rely entirely on cloud-based servers.

One or more types of devices in the gaming data center 376 (or elsewhere) may be capable of executing middleware, e.g., for data management and/or device communication. Authentication information, player tracking information, etc., including but not limited to information obtained by EUDs 364 and/or other information regarding authorized users of EUDs 364 (including but not limited to the authorized users 374a-374c), may be stored on storage devices 382 and/or servers 384. Other game-related information and/or software, such as information and/or software relating to leaderboards, players currently playing a game, game themes, game-related promotions, game competitions, etc., also may be stored on storage devices 382 and/or servers 384. In some implementations, some such game-related software may be available as "apps" and may be downloadable (e.g., from the gaming data center 376) by authorized users.

In some examples, authorized users and/or entities (such as representatives of gaming regulatory authorities) may obtain gaming-related information via the gaming data center 376. One or more other devices (such EUDs 364 or devices of the gaming data center 376) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

As described above, many components are housed inside the main cabinet 116 of the gaming device 104A of FIG. 1. Further, cabinet 218 or topper display 216 may also house a number of other components which may be used to add features to a game being played on gaming device 200 of FIG. 2A.

Figure 4:
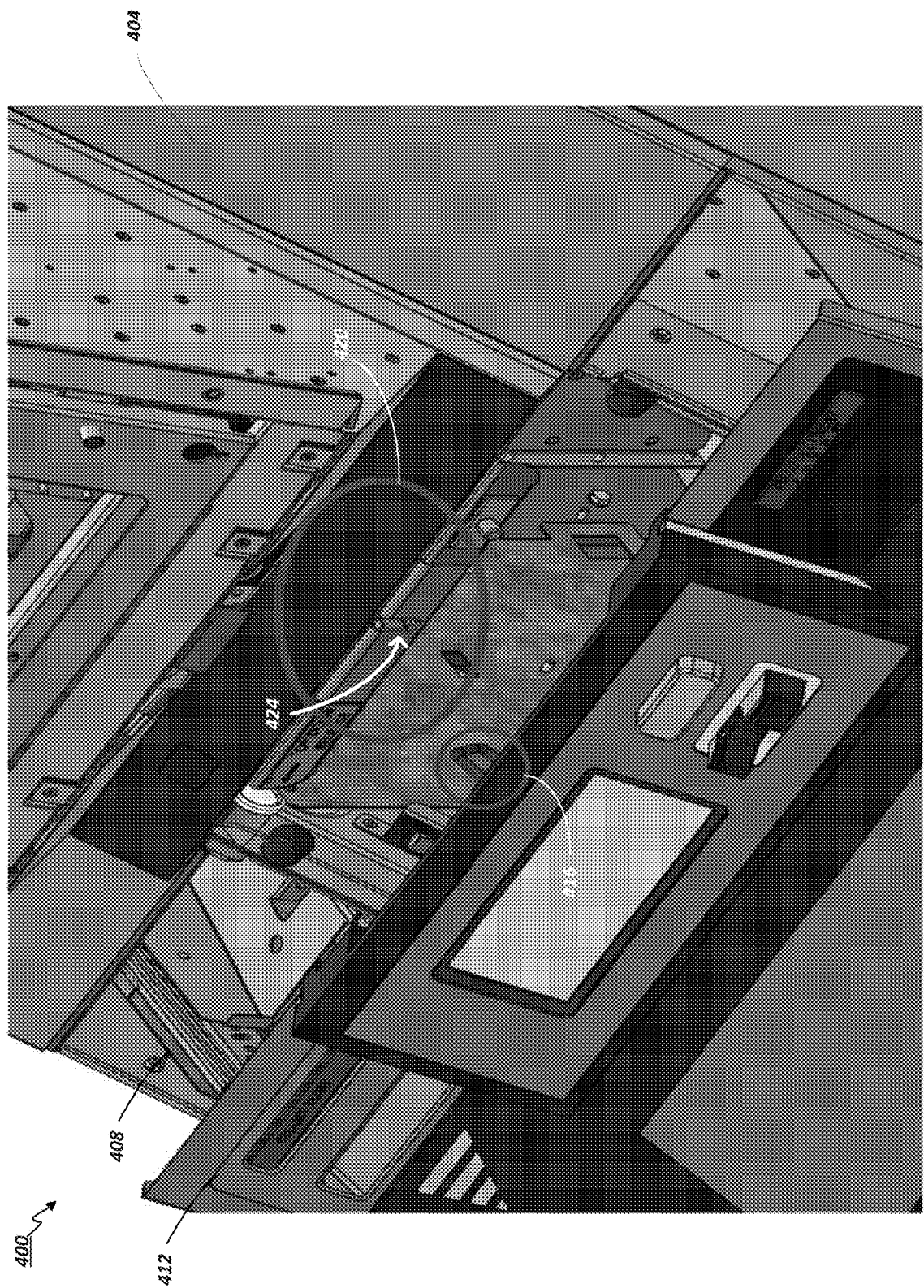
FIG. 4 illustrates a portion of an electronic gaming machine.

FIG. 4 illustrates a portion of an electronic gaming machine 400 that includes a cabinet 404. An example of cabinet 404 may take the form of the main cabinet 116 depicted FIG. 1. The cabinet 404 defines an interior space 408. As shown, the electronic gaming machine 400 includes a door 412 releasably fastened to the cabinet and with a portion of door 412 moved away from the cabinet 404, and in an unlocked position or state. When the door 412 is in this unlocked state or position, access to some or all of the components located or positioned within the interior space 408 is permitted.

The door 412 may comprise a metal, non-metal or composite material, different or the same as the cabinet 404, that may complement or enhance security of the door 412 in relation to the cabinet 404. While door 412 is depicted in FIG. 4 on one side of the cabinet 404, other door 412 locations are contemplated as is the use of more than one door 412 that employs a securing housing or assembly 420. The security housing 420 may be entirely positioned in the cabinet 404. Other positions for the security housing 420 are contemplated, e.g., on the door 412, partially within the cabinet 412 or in other locations within the cabinet 404.

In some embodiments, the door 412 may also include a striker 416 that may be received by the security housing or assembly 420. Specifically, the security housing 420 may receive the striker 416 at an opening 424. When the security assembly 420 fully engages the striker 416, the door 412 is in a locked position or state. That is, the door 412 moves between the locked position that wholly prevents or occludes any access to the interior space 408, and the unlocked position that may permit access to, at least a portion of, the interior space 408.

Figure 5:
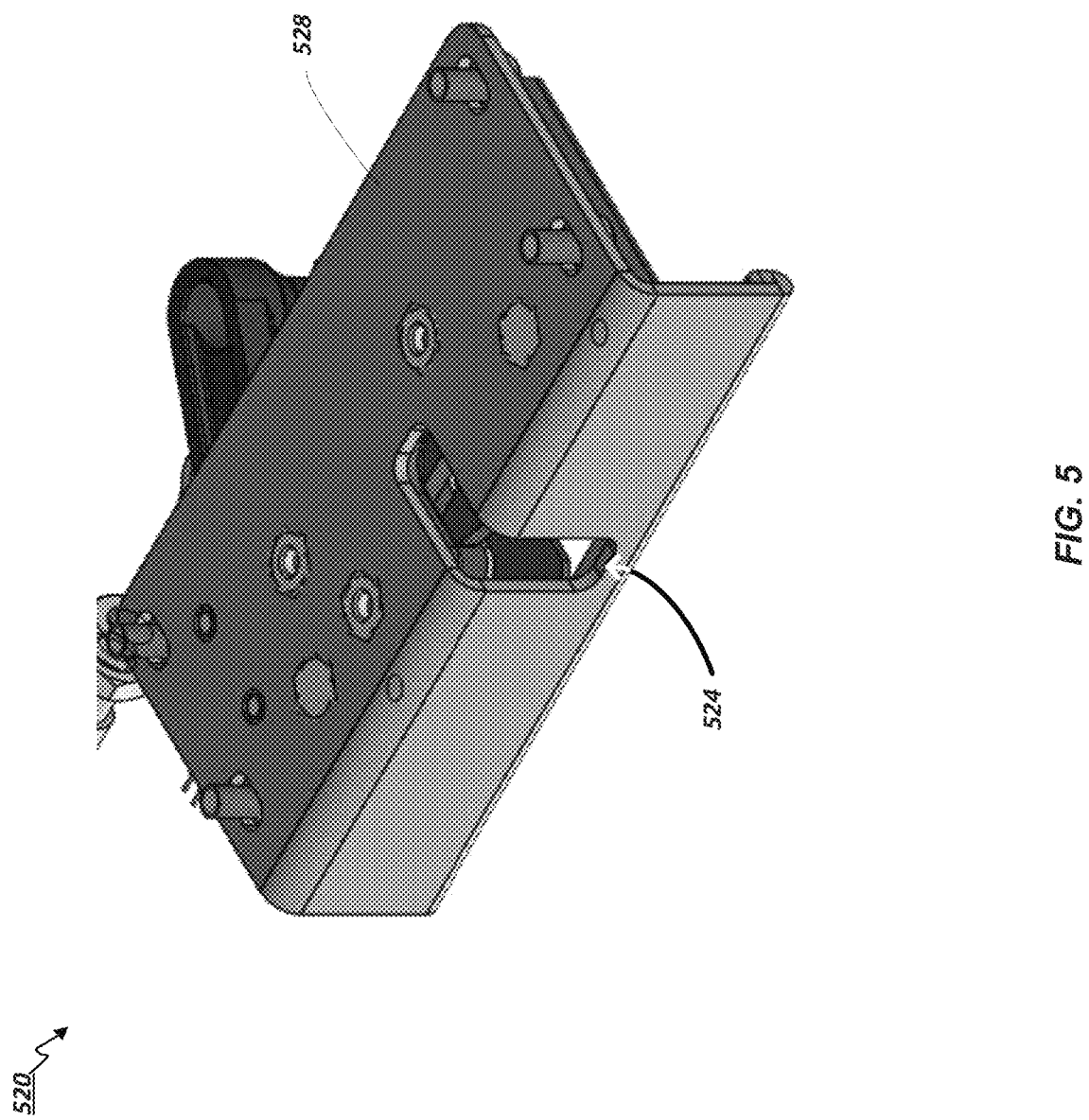
FIG. 5 illustrates an exemplary security housing according to some aspects of the present disclosure.

FIG. 5 illustrates a perspective view of the assembled security housing or assembly 520. As shown in FIG. 5, the security assembly 520 comprises a housing 528 with the opening 524 defined according to some aspects of the present disclosure. The opening 524 may take a variety of different sizes and shapes to accommodate different sized and shaped strikers (not shown, but may be similar to the striker 416 of FIG. 4). In other embodiments, no opening 524 is needed where the door 512 (similar to door 412 of FIG. 4) can be secured to, on or within the security housing 520 by other means, e.g., magnets or other mechanical structures. The security housing 520 in its entirety may be positioned within the interior space 508 and may be integrally or releasably mounted in a cabinet (not shown, but may be similar to the cabinet 404 of FIG. 4). Other locations for the security housing 520 are contemplated depending on the location and/or configuration of the door 512.

Figure 6A:
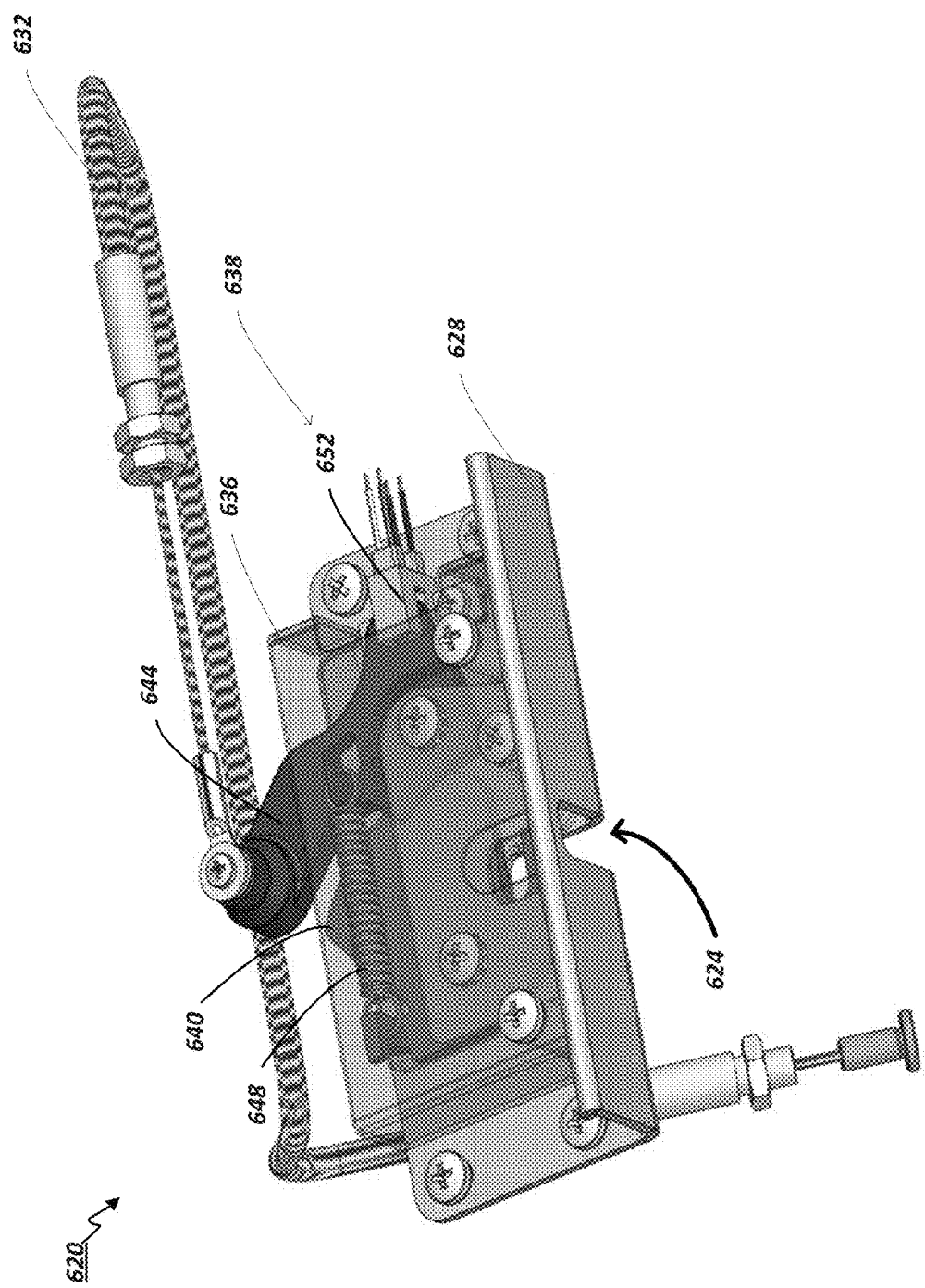
FIG. 6A illustrates the exemplary security housing of FIG. 5 in a locked state.

FIG. 6A illustrates a perspective view showing the security assembly 620 in a locked position or state (while a striker is not shown here, but may be similar to the striker 416 of FIG. 4). As shown, the locking assembly 638 may comprise a latch 640, an actuator 644, and a spring 648, and an optical switch 652. The latch 640 may be a single or dual stage rotary latch assembly, for example.

In some embodiments, the spring 648 couples the actuator 644 to the latch 640 to relay rotational movements between the latch 640, and the optical switch 652. An optical path or signal may be selectively created or discontinued by the optical switch 652 in relation to the rotational movements of the latch 640. Optical switch 652 may be arranged so as to position a transmitter above and a receiver below the actuator 644 (e.g., sandwiching the actuator 644) when the door 612 (similar to door 412 of FIG. 4) is in the locked state or position. In some embodiments, the optical switch 652 may be a thru-beam switch that includes a transmitter or emitter, and a receiver. In such a thru-beam switch, the emitter is aligned with the receiver such that a maximum or predetermined amount of pulsed light signal generated from the emitter may be detected by the receiver. As such, when an object, such as the actuator 644, placed between the transmitter and the receiver blocks the pulsed light signal, causing the receiver to switch to a discontinued state or an unlocked state and to generate a discontinued signal indicating that the pulsed light signal has been discontinued. When the object such as the actuator 644 no longer blocks the pulsed light signal, the receiver may switch or return to a normal state or a locked state and to generate a signal indicating that the maximum or predetermined amount of pulsed light signal has been detected by the receiver. Such an arrangement, similar to that shown in FIG. 6B, may create, or in some cases discontinue, an optical signal path between the transmitter and the receiver. Other optical switch arrangements with the actuator 644 are contemplated, e.g., the receiver is arranged above and the transmitter is arranged below the actuator 644.

A cover 636 may wholly or partially enclose a locking assembly 638. The security assembly 620 may also be coupled to a pull cable 632 or other suitable mechanism to release the locking assembly 638 and allow the door 612 to be moved or positioned in an unlocked state or position. In such embodiments, the pull cable 632 may, in turn, be coupled to the door 612. Other assemblies could may be coupled to the security assembly to unlock or lock the door 612 to facilitate or prevent access to the interior space 408, such as facial recognition, RFID devices, biometric readers (eye or hand, e.g.), and secure mobile devices. Such other assemblies may add an additional degree of security for the electronic gaming machine 600.

Figure 6B:
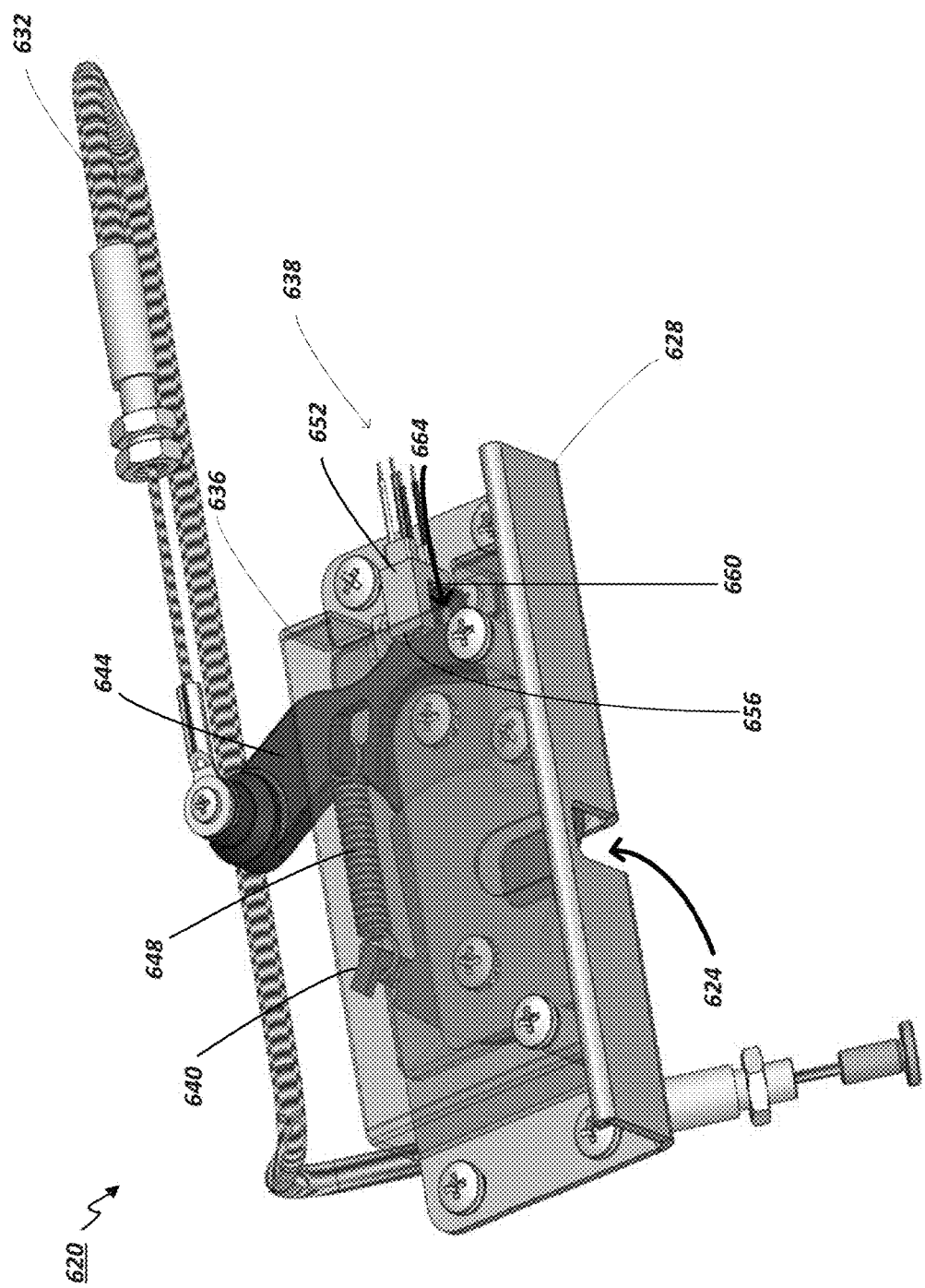
FIG. 6B illustrates the exemplary security housing of FIG. 5 in an unlocked state.

FIG. 6B illustrates the security assembly 620 of FIG. 6A in an unlocked position or state. FIG. 6B, for example, illustrates the actuator 644 defining an aperture or a channel 664 through which an optical path may be formed. In this example, the channel 664 has been exposed as a result of the rotation of the latch 640 that arises in a misalignment of channel 664 in relation to the optical switch 652. This non-alignment or misalignment results in the actuator 644 optically blocking, some or all, the signal transmitted from the optical transmitter 656 to be received by the optical receiver 660.

In some embodiments, however, when the door 612 moves from the unlocked position into the locked position, the striker 416 fully engages with the latch 640 at the striker recess. Once the striker 416 begins engagement with the latch 640, this causes both the latch 640 and the actuator 644 to rotate such that the channel 664 may be aligned with the optical transmitter 656 and the optical receiver 660. When optical transmitter 656 and optical receiver 660 are aligned, an optical path may be formed from the optical transmitter 656, through the channel 664, to the optical receiver 660.

Figure 6C:
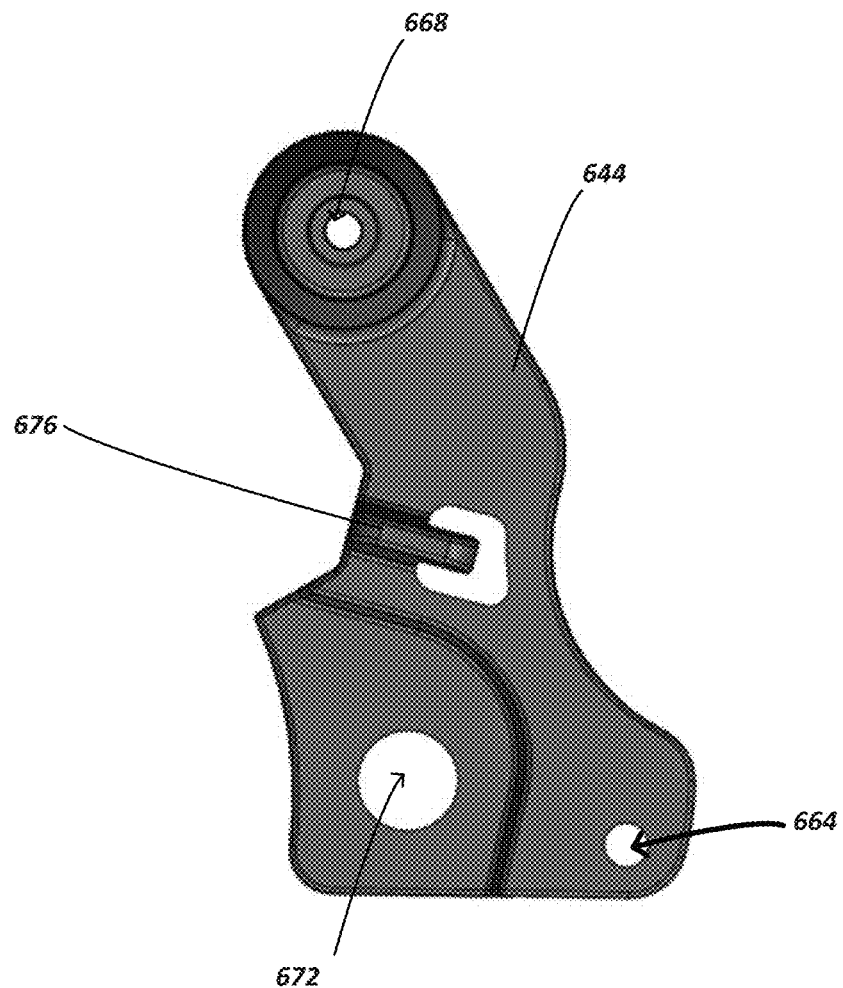
FIG. 6C illustrates an actuator for use the exemplary security housing of FIG. 6B.

FIG. 6C illustrates the actuator 644 of FIG. 6B, wherein like numerals refer to like parts. The actuator 644 defines the channel 664 as shown to form a portion of the optical path. The actuator 644 also defines a first through-hole 668 to receive one end of the pull cable 632, and a second through-hole 672 to rotatably secured to the housing 628. The actuator 644 also includes a fastener 676 to releasably couple the spring 648 to the latch 640.

Figure 6D:
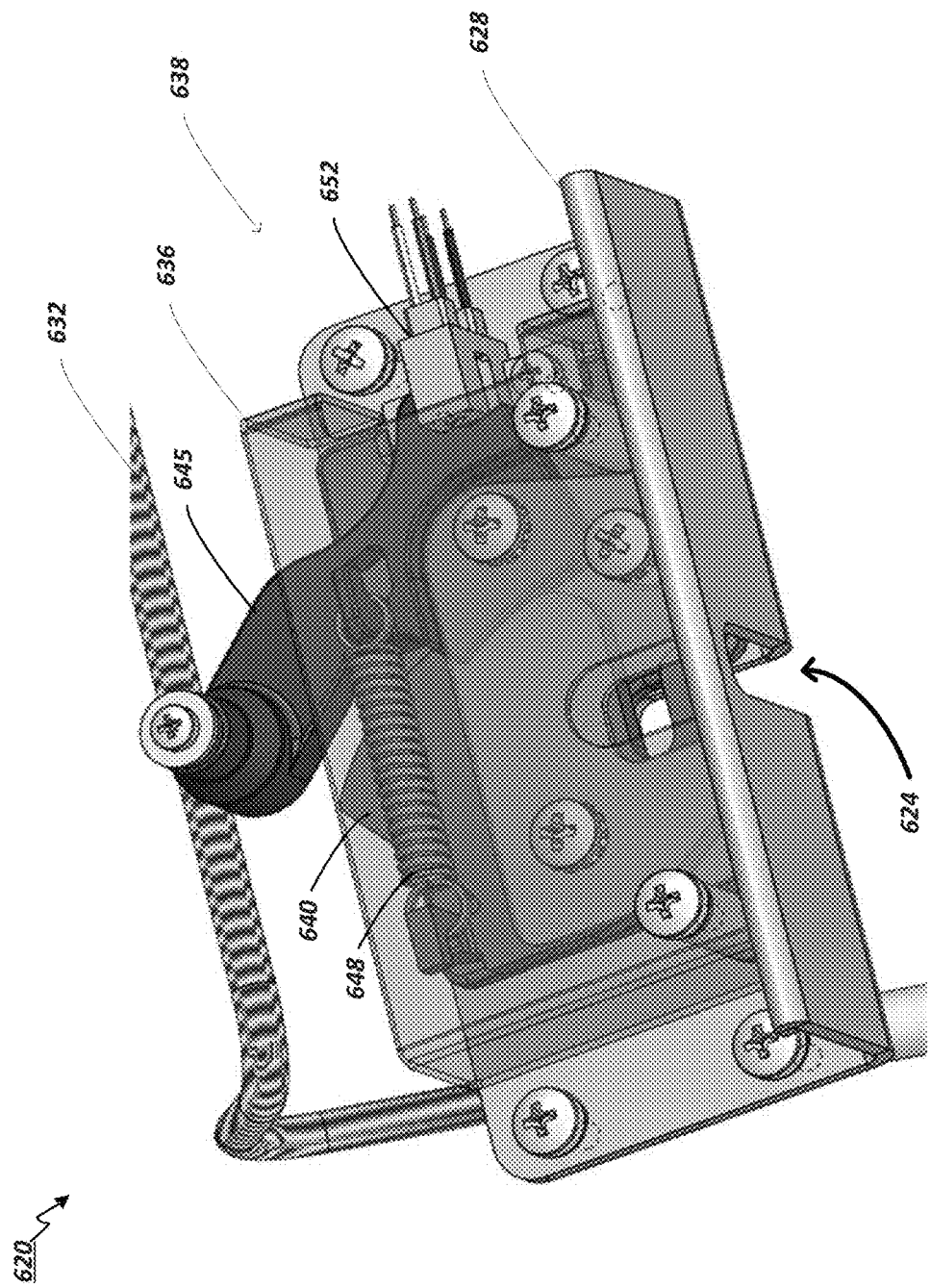
FIG. 6D illustrates an alternative security housing of FIG. 5 in a locked state.
Figure 6E:
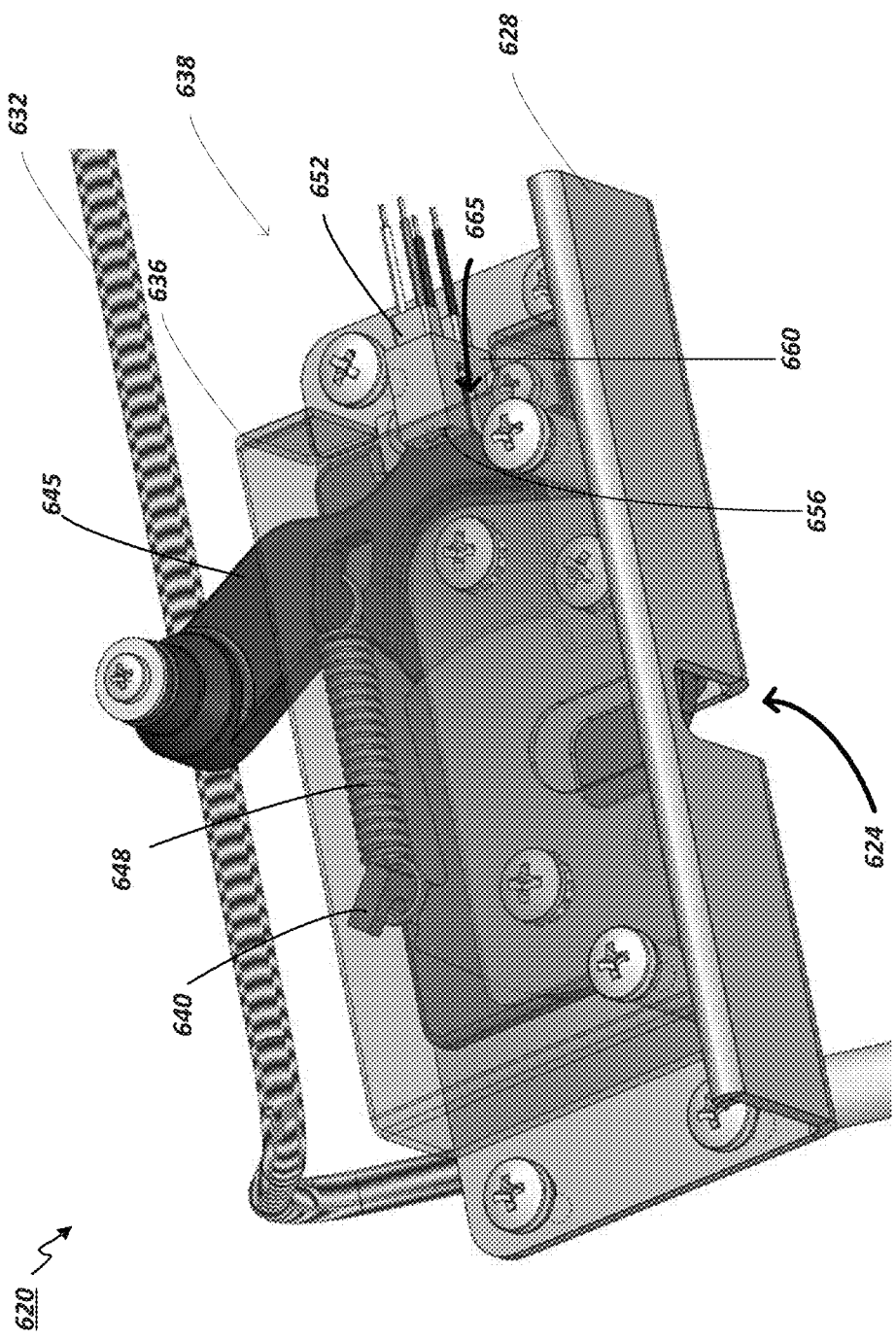
FIG. 6E illustrates the alternative security housing of FIG. 5 in an unlocked state.

FIG. 6D and FIG. 6E illustrate the security assembly 620 of FIG. 6A with an alternative actuator 645 in the locked state and the unlocked state, respectively, wherein like numerals refer to like parts. Similar to FIG. 6A, the security assembly 620 of FIG. 6D includes the alternative actuator 645 with a recess 665 acting as an optical channel. The optical path or signal may be selectively created or discontinued by the optical switch 652 in relation to the rotational movements of the latch 640 via the alternative actuator 645 when the door 612 is in the locked state or position. For example, when the alternative actuator 645, placed between the transmitter 656 and the receiver 660 blocks the pulsed light signal, causing the receiver 660 to switch to the unlocked state and to generate a discontinued signal indicating that the pulsed light signal has been discontinued. Conversely, when the alternative actuator 645 no longer blocks the pulsed light signal, the receiver 660 may return to the locked state and generate a signal indicating that the maximum or predetermined amount of pulsed light signal has been detected by the receiver 660.

Figure 6F:
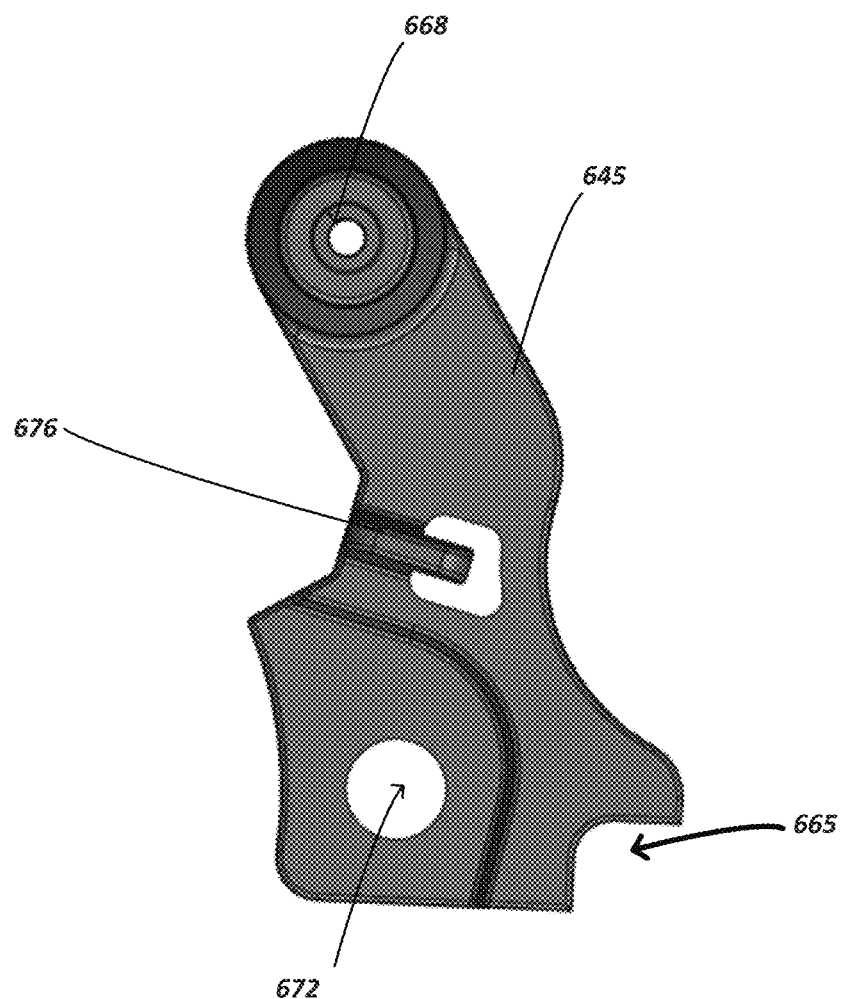
FIG. 6F illustrates an alternative actuator for use the exemplary security housing of FIG. 6E.

FIG. 6F illustrates the alternative actuator 645 of FIG. 6E, wherein like numerals refer to like parts. The alternative actuator 645 defines the recess 665 acting as the optical channel of the optical path. In some embodiments, the recess 665 allows for wider optical signal stray variations or tolerance between the transmitter 656 and the receiver 660. In such embodiments, when the door 612 is accidentally moved for a short period of time, for example, when a player gets excited after a win and kicks the door 612, the recess 665 acting as the optical channel may slightly move for a short period of time. Such slight movements of the door 612 may still allow the receiver 660 to continuously detect the optical signal transmitted from the transmitter 656 due to its wider optical tolerance, without falsely generating the discontinued signal indicative of the unlocked state.

Figure 7A:
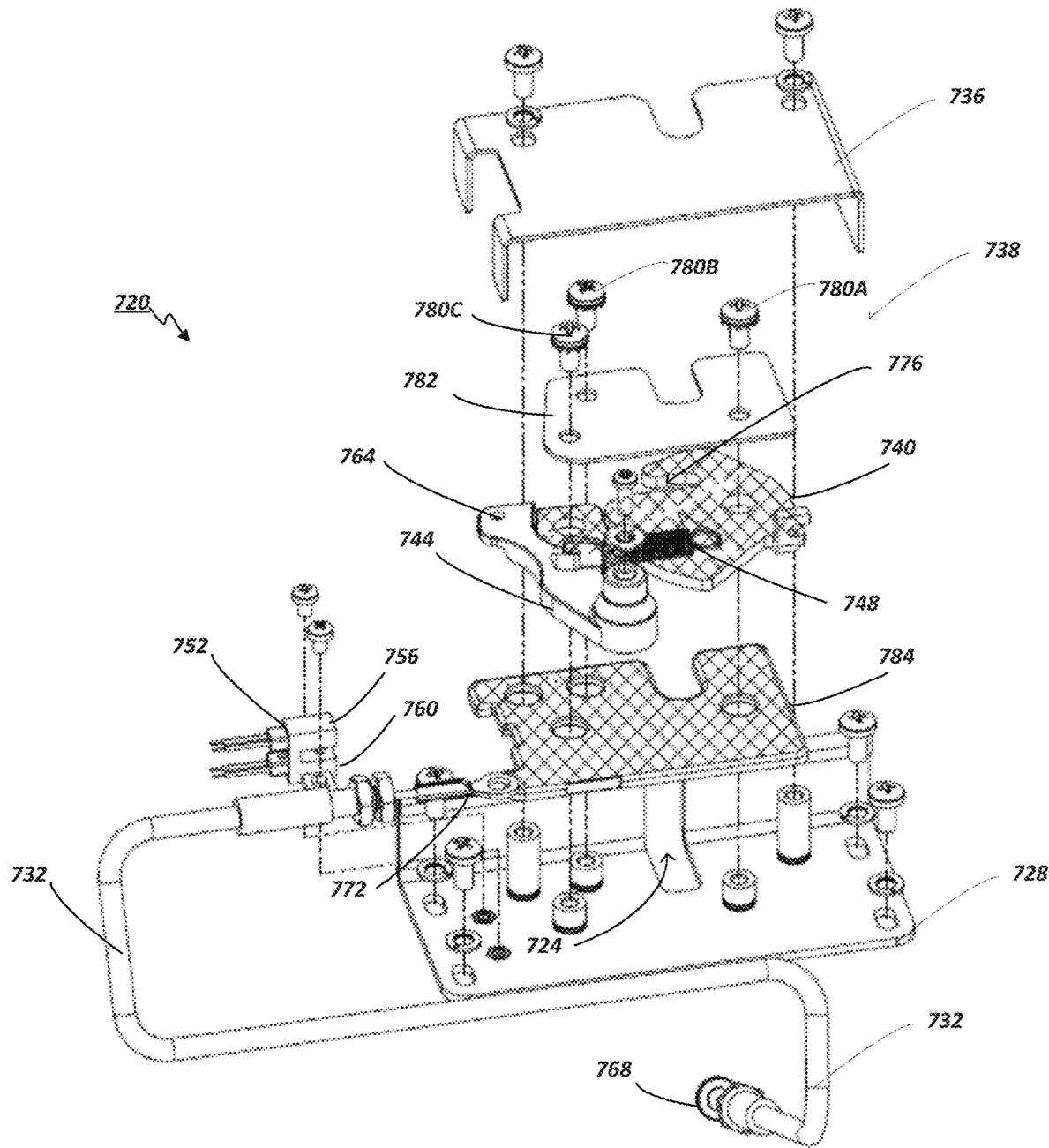
FIG. 7A illustrates an exploded view of an exemplary security housing for use a first type of cabinet.

FIG. 7A illustrates an exploded view of an embodiment of the security assembly 720. The security assembly 720 may be employed with a cabinet 704 (not shown), similar to gaming device 104X of FIG. 1, or the MarsX cabinet produced by Aristocrat Technologies™.

As shown in FIG. 7A, the optical switch 752 may comprise an optical transmitter 756 and an optical receiver 760. The optical transmitter 756 may be operable to generate an optical signal. For example, optical transmitter 756 may use an electrical signal to modulate the power of a light source to generate the optical signal or waveform. Optical receiver 760 may be operable to receive a transmitted optical signal. For example, optical receiver 760 may be a detector that may detect the presence or absence of a light signal formed in the optical path. The optical receiver 760 may have different sensitivities depending on the optical signal needing to be detected and/or arrangement of the actuator in relation to the optical switch 752. Different arrangements of the optical transmitter 756 in relation to the optical receiver 760 are also contemplated. Furthermore, other type of transmitters and receivers may also be used in place of the optical transmitter 756 and the optical receiver 760. For example, in some other embodiments, an electromagnetic switch (not shown) may be used in place of the optical switch 752, whereas the actuator 744 may use non-ferrous or non-conductive materials. In such cases, when the actuator 744 is blocking any electromagnetic wave transmitted from the electromagnetic switch, the cabinet may be in the unlocked state.

In some embodiments, the actuator 744 defines an aperture or a channel 764 through which an optical path may be formed with the optical transmitter 756 and the optical receiver 760. Specifically, an optical path may be formed when an optical signal is transmitted from the optical transmitter 756 and received at the optical receiver 760 through the channel 764.

For example, in an aspect of this disclosure, when the striker 716 is positioned in the opening 724 engages the latch 740 of the security assembly 720, the latch 740 rotates the actuator 744. In turn, the actuator 744 aligns with the channel 764 to further form or complete the optical path. The optical path illustrated starts from with the optical transmitter 756 transmitting an optical signal through the channel 764 and ends with the optical receiver 760 receiving the optical signal. When a complete optical path is detected, the door is in a locked position or state. In such a case, the security assembly 720 may also communicate to a processor or controller 202 the lock position state of a door (not shown, but may be similar to door 412 of FIG. 4), which here is illustrated in the locked position or state, and further processing or storage of the lock position or state information may occur for a variety of operational or other security purposes. The lock position or state of a door may be either a locked position or state or an unlocked position or state.

The optical path may be discontinued when the optical signal is not received or detected at the optical receiver 760. For example, when the channel 764 is not aligned or misaligned with the optical transmitter 756 and the optical receiver 760 due to the actuator 744 having been rotated, the optical path is discontinued. In such a case, the security assembly 720 may also communicate the lock position or state of a door (not shown, but may be similar to door 412 of FIG. 4), which here is illustrated in the unlocked position or state, and further processing or storage of the lock position or state information may occur for a variety of operational or other security purposes.

By way of further example, in yet other embodiments, the optical path completed may further result in the security assembly 720 and/or the optical receiver 760 generating a locked signal or a locked state signal to a processor or the game controller 202, and, in turn, the casino management system server 114 (of FIG. 2A). In other embodiments, the security assembly 720 and/or the optical receiver 760 may transmit the locked signal or the locked state signal to the system 100, the server computers 102, or the casino management system server 114 (of FIG. 2A), either directly, or indirectly, wired, or wirelessly. Thus, for example, when the game controller 202 or the casino management system server 114 continues to detect that the optical path is complete, the door 712 is in a locked position or locked state.

Conversely, when the door 712 is disengaged from the security assembly 720 or moved away from the cabinet 704, the door 712 engages the pull cable 732, and, in turn, the actuator 744 to allow the latch 740 to disengage the striker 716. As the latch 740 rotates, the channel 764 is moved out of alignment with the optical transmitter 756 to partially or wholly prevent transmitting the optical signal to the optical receiver 760, which results in discontinuing the optical path. When the optical path is discontinued, and/or when the optical receiver 760 does not receive any transmitted optical signal from the optical transmitter 756, the security assembly 720 and/or the optical receiver 760 may generate an unlocked signal or an unlocked state signal, and transmit the unlocked signal to a processor, the game controller 202 and/or the casino management system server 114 to indicate that the door 712 is disengaged from the cabinet 704 and/or is opened for access to the interior space 408. In other embodiments, the security assembly 720 and/or the optical receiver 760 may transmit the unlocked signal or the unlocked state signal to the system 100, the server computers 102, or the casino management system server 114 (of FIG. 2A), either directly, or indirectly, wired, or wirelessly, to indicate that the door 712 has been disengaged. The door 712, in such cases, is in the unlocked position or the unlocked state.

Furthermore, in an embodiment, when the door 712 moves from the locked position or state, the pull cable 732 responds to the movement of the door 712, for example, at a first end 768, which is connected to a pull lever (not shown). Second end 772 moves away from and rotates the actuator 744. When the door 712 is moving from a locked position or state into the unlocked position or state, the rotation of the latch 740 disengages the striker 716 from a striker recess 776. The rotation, or in some cases translation, of the actuator 744 causes a non-alignment or misalignment of the channel 764 with the optical transmitter 756 and the optical receiver 760, which discontinues the optical path.

Figure 7B:
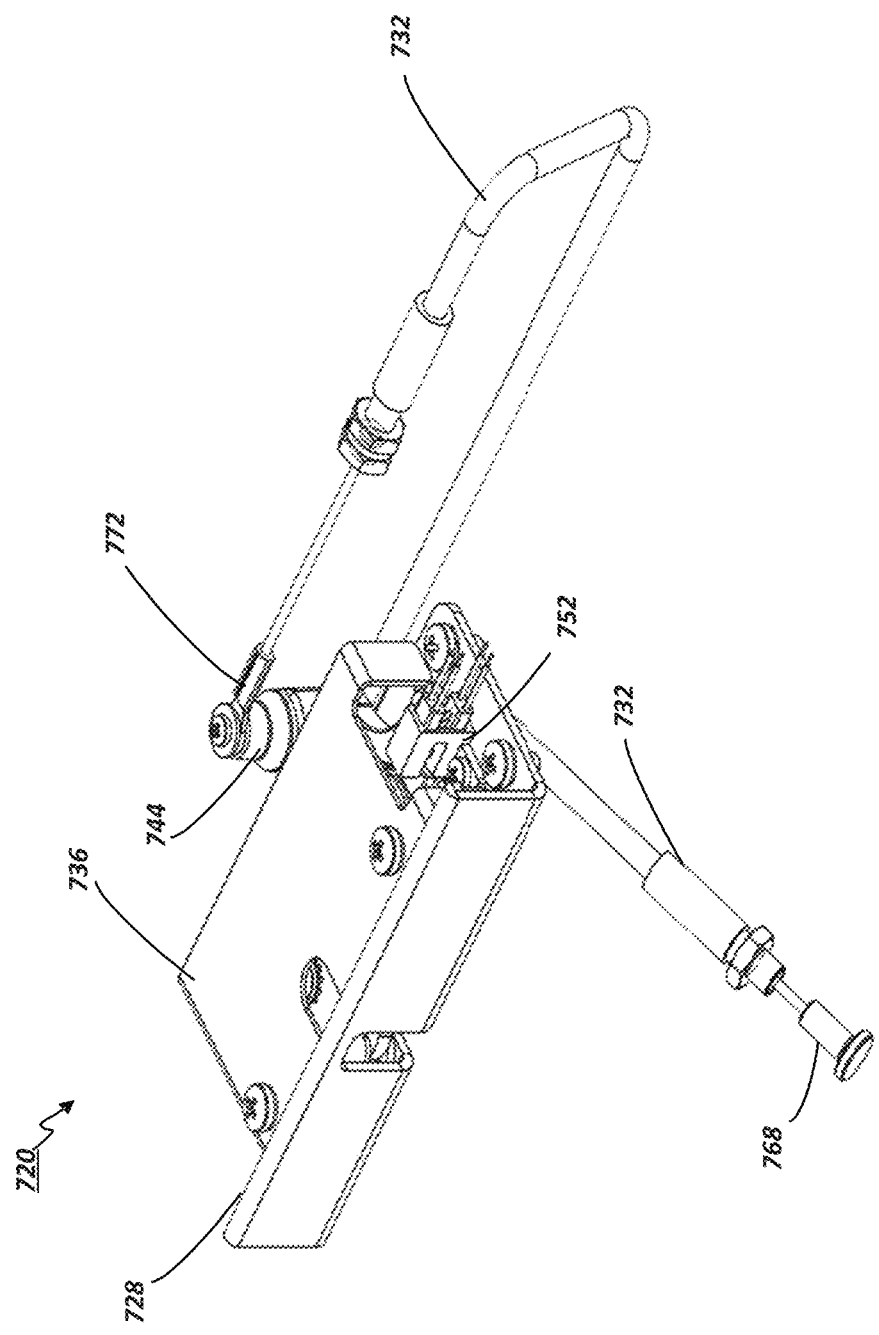
FIG. 7B illustrates an assembled view of an exemplary security housing of FIG. 7A.

Referring back to FIG. 7A and FIG. 7B, an embodiment of the security assembly 720 is generally secured to the housing 728 with screws 780A, 780B, 780C. For example, screw 780A secures a top latch bracket 782 to the housing 728 through the latch 740 and a cam plate 784, thus allowing the latch 740 to have a degree of rotatable movement with respect to screw 780A. Screw 780B secures the cam plate 784 to the housing 728. Screw 780C secures the top latch bracket 782 to the housing through the actuator 744 and the cam plate 784; thus, allowing the actuator 744 to a degree of rotatable movement with respect to screw 780C.

In some embodiments, the second end 772 is also coupled to the actuator 744 to control the rotational movement as discussed above with respect to the locked and the unlocked positions or states. Furthermore, at least a portion of surfaces of the latch 740, the actuator 744, and the cam plate 784 are generally lubricated to allow for smooth movements.

Figure 8A:
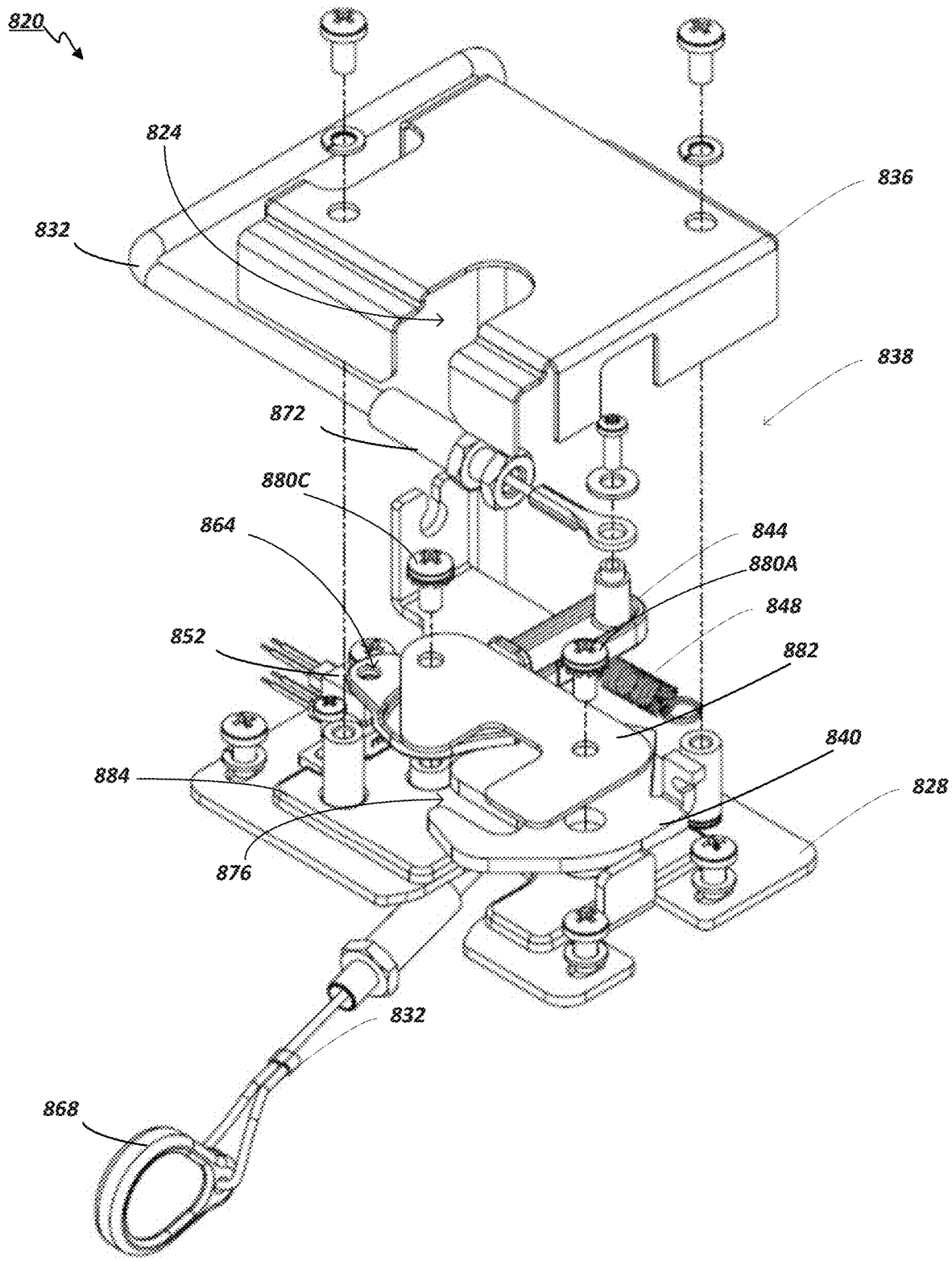
FIG. 8A illustrates an exploded view of an exemplary security housing for use a second type of cabinet.
Figure 8B:
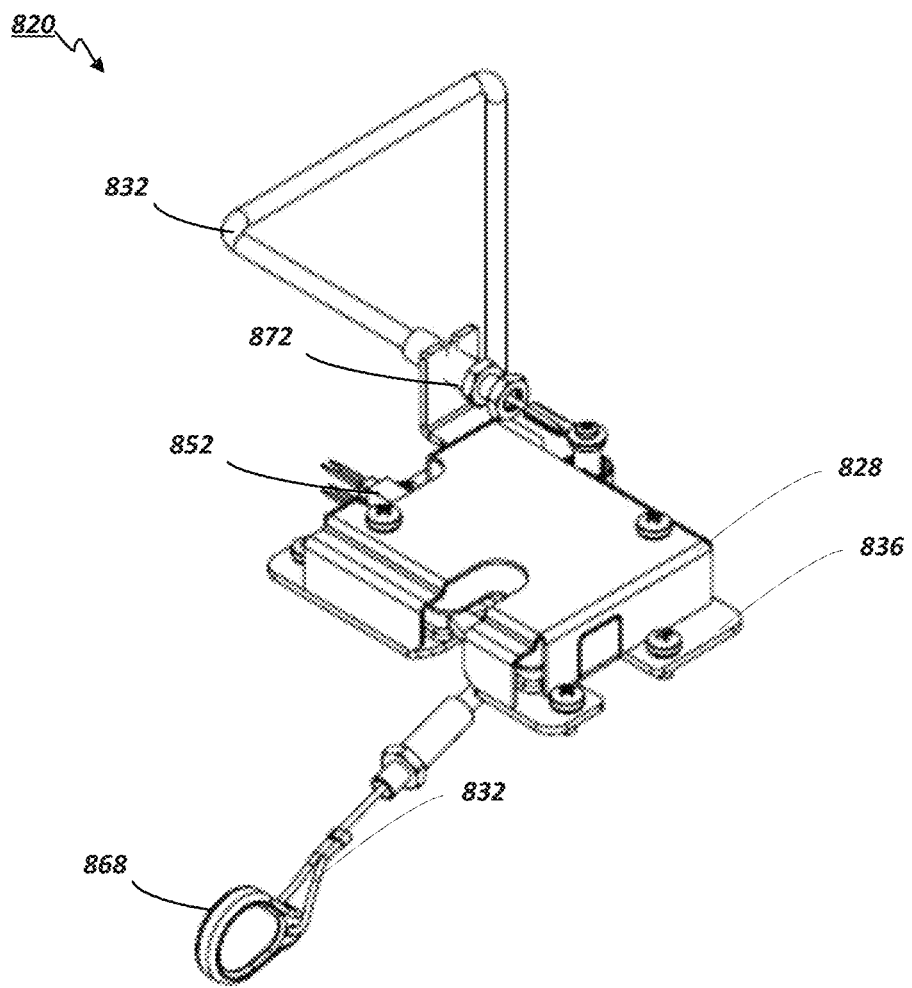
FIG. 8B illustrates an assembled view of an exemplary security housing of FIG. 8A.

FIG. 8A illustrates an exploded view of a security assembly 820 for use a second type of cabinet 804, similar the gaming machines 104C described in FIG. 1. FIG. 8B illustrates an assembled view of the security assembly 820 of FIG. 8A, respectively, wherein like reference numerals refer to like parts.

The security assembly 820 is similar to the security assembly 720 of FIG. 7A. For example, the security assembly 820 also includes the locking assembly 838 and the optical switch 852. The security assembly 820 connects the door 812 to the cabinet 804, via the locking assembly 838 and a second pull cable 832. Similar to the security assembly 820, an actuator 844 also defines a channel 864 to form an optical path with the optical switch 852. The optical path may be discontinued when the optical signal is not received at a receiver 860 at the optical switch 852. For example, the optical path may be discontinued when the channel 864 is misaligned within the optical switch 852 due to the actuator 844 having been moved or rotated.

Additionally, in another aspect of the disclosure, when a first end 868 is pulled, for example, by an operator, the second end 872 is moved away from the actuator 844 to put the door 812 in the unlocked position or state. When the door 812 moves into the unlocked position, rotation of the latch 840 disengages the striker 816 from a striker recess 876, and, in turn, causes a misalignment of the channel 856 with the optical switch 852 to discontinue the optical path. Conversely, when the door 812 moves from the unlocked position into the locked position, the striker 816 engages with the latch 840 at the striker recess 868. Both the latch 840 and the actuator 844 rotate and align the channel 856 with the optical switch 852 thus forming the optical path, which puts the door 812 in the locked position or state.

Figure 9:
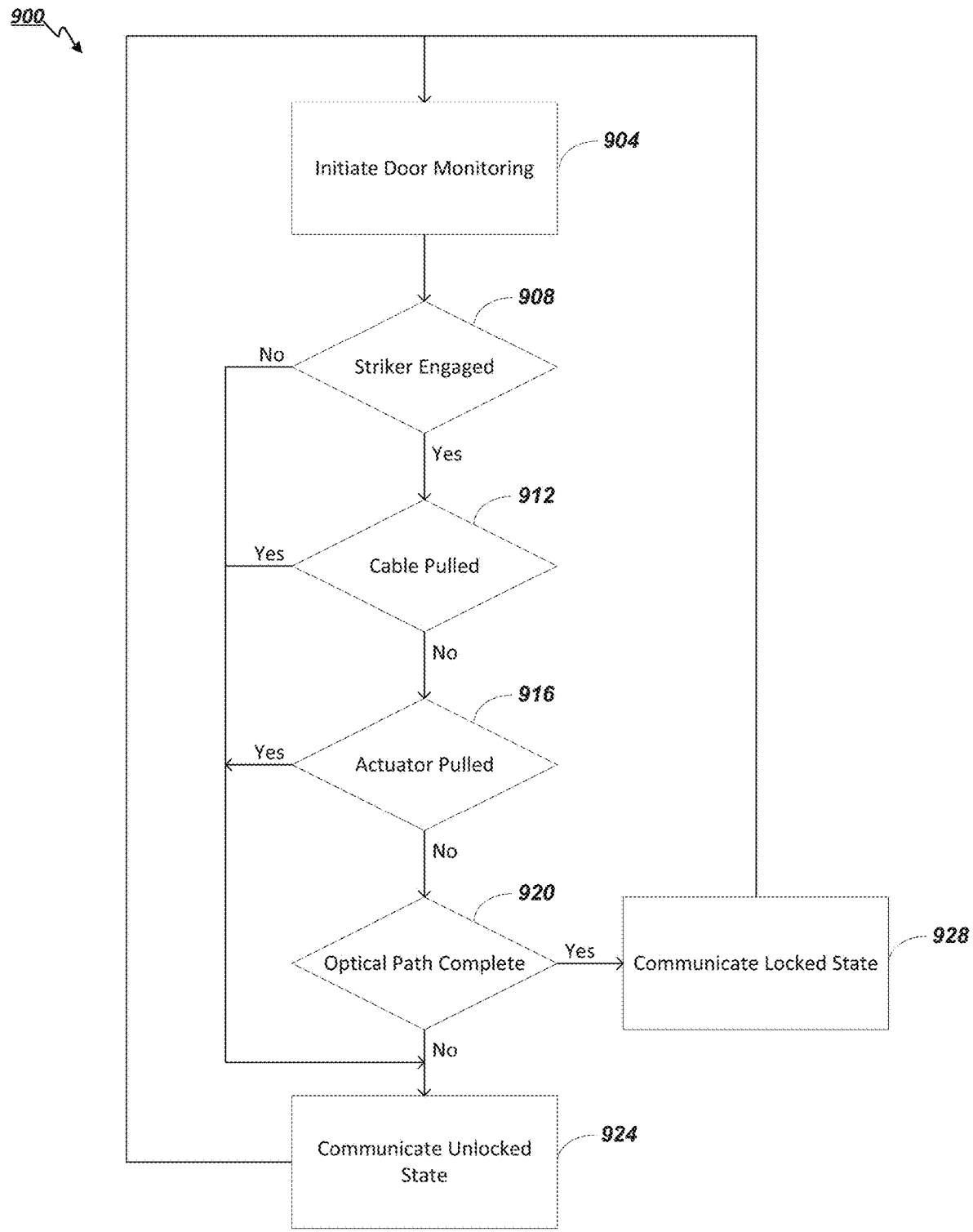
FIG. 9 illustrates an exemplary door monitoring flow process.

FIG. 9 illustrates an embodiment of a door monitoring flow process 900 for an electronic gaming machine with a cabinet 904. The door monitoring flow process 900 initiates door monitoring at step 904, for example, when the gaming machine is switched on or game play is initiated.

At step 908, the door monitoring flow process 900 may optionally detect whether a striker (such as the striker 416 of FIG. 4) has engaged with a latch (such as the latch 640 of FIG. 6A). When the striker has not engaged with the latch, the door monitoring flow process 900 proceeds to communicate to a processor (or game controller 202 of FIG. 2A) to indicate the door state or position; here, the cabinet has been opened at step 924, in an unlocked state.

As discussed above, even when the striker is engaged with a striker recess (such as the striker recess 776 of FIG. 7A) in the latch, the cabinet may not be completely closed. Thus, starting with step 912, the door monitoring flow process 900 continues to monitor a number of parameters.

For example, at step 912, the door monitoring flow process 900 monitors if a pull cable (such as the pull cable 632 of FIG. 6A) has been engaged as a result of a cabinet door being moved or opened. When the door monitoring flow process 900 detects that the pull cable has been engaged, the door monitoring flow process 900 proceeds to communicate to the processor to indicate that the cabinet is in the unlocked state at step 924.

Similarly, at step 916, the door monitoring flow process 900 monitors if an actuator (such as the actuator 644 of FIG. 6A) has been moved as a result of the pull cable being engaged. When the door monitoring flow process 900 detects that the actuator has been moved, the door monitoring flow process 900 proceeds to communicate to the processor to indicate that the cabinet is in the unlocked state at step 924.

Also at step 920, the door monitoring flow process 900 monitors if the optical path is formed or completed as a result of the transmitter and the receiver aligning with the channel. As discussed above with respect to FIG. 6A, the actuator defines a channel, and a portion of the actuator may be enclosed by an optical switch (such as the optical switch 662) having a transmitter (such as the optical transmitter 756 of FIG. 7A) and a receiver (such as the optical receiver 760 of FIG. 7A) align the transmitter and the receiver with the channel when the cabinet door is in locked position or state (e.g., the door is closed). When the transmitter transmits an optical signal through the channel and the optical signal transmitted is received at the receiver, an optical path is formed. When the optical path is formed, the door may be considered in a locked position or state. When the door monitoring flow process 900 detects that the optical path is formed as a result of the actuator aligning the channel with the transmitter and the receiver, the door monitoring flow process 900 proceeds to communicate to the processor to indicate that the cabinet has been locked at step 928, in a locked state.

In a similar way, when the door monitoring flow process 900 detects that the optical path is discontinued as a result of the actuator not aligning or misaligning the channel with the transmitter and the receiver, the door monitoring flow process 900 proceeds to communicate to the processor to indicate that the cabinet is in the unlocked state at step 924. As long as the gaming machine remains operating, the door monitoring flow process 900 continues to monitor the door state at step 904.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine comprising:
   a cabinet defining an interior space;
   a door releasably fastened to the cabinet, the door operable to move between a locked state preventing access to the interior space and an unlocked state permitting access to at least a portion of the interior space; and
   a security housing comprising a locking assembly and an optical switch coupled to a processor, the locking assembly comprising an actuator defining a channel, the optical switch comprising a transmitter and a receiver, wherein, when the door engages the locking assembly, the actuator is operable to move the channel to align with the transmitter on one side of the channel and the receiver on a different side of the channel to form an optical path between the transmitter and the receiver through the channel, and the optical switch is operable to communicate the locked state.

2. The electronic gaming machine of claim 1, wherein, when the door disengages the locking assembly, the actuator is operable to move the channel to block the optical path between the transmitter and the receiver through the channel thereby discontinuing the optical path and the optical switch is operable to communicate the unlocked state.

3. The electronic gaming machine of claim 1, wherein the optical switch is operable to monitor a) the optical path formed between the transmitter and the receiver when the door is in the locked state, and b) a discontinued optical path when the door is in the unlocked state, and to communicate one of the locked state and the unlocked state based on the optical path formed and the discontinued optical path.

4. The electronic gaming machine of claim 1, wherein the locking assembly includes a latch, the door includes a striker, wherein the striker engages the latch to secure the door is in the locked state.

5. The electronic gaming machine of claim 4, wherein, when the striker engages the latch, the latch rotates and secures the striker in the locked state.

6. The electronic gaming machine of claim 4, wherein the actuator is coupled to the latch wherein, when the door engages the latch, the latch and the actuator are operable to move the channel to align with the transmitter and the receiver to form the optical path between the transmitter and the receiver through the channel, and the optical switch is operable to communicate the locked state.

7. The electronic gaming machine of claim 6, wherein the security housing defines an opening through which the striker is received.

8. The electronic gaming machine of claim 7, further comprising a cable coupled to the door, wherein when the door moves from the locked state to the unlocked state, the cable and the actuator are operable to disengage the striker from the latch, thereby rotating the actuator to discontinue the optical path through the channel.

9. The electronic gaming machine of claim 8, wherein when the cable is engaged to move the actuator, the actuator is operable to rotate and optically block the channel.

10. The electronic gaming machine of claim 9, further comprising a spring coupling the actuator to the latch, and relaying movements between the latch and the actuator.

11. The electronic gaming machine of claim 1, wherein the optical switch defines a latch access to receive the channel that forms the optical path when the door is in the locked state.

12. The electronic gaming machine of claim 11, wherein the locking assembly includes a latch, and the door includes a striker operable to engage the latch when the door is in the locked state, and wherein the actuator rotates to disengage the striker when the door is in the unlocked state, thereby optically blocking the channel and discontinuing the optical path.

13. The electronic gaming machine of claim 11, wherein the locking assembly further includes a latch rotatably coupled to the actuator, and the door includes a striker, and wherein when the striker engages the latch, the latch rotatably actuates the actuator to complete the optical path through the channel when the door is in the locked state.

14. The electronic gaming machine of claim 11, wherein the optical switch includes an optical transmitter operable to transmit an optical signal and an optical receiver operable to receive a transmitted signal, the optical transmitter and the optical receiver defining the latch access.

15. The electronic gaming machine of claim 14, wherein the optical switch is arranged to position the transmitter above and the receiver below the actuator, when the door is in the locked state.

16. The electronic gaming machine of claim 14, wherein the optical transmitter, the actuator, and the optical receiver form the optical path via the channel defined by the actuator, when the door is in the locked state.

17. The electronic gaming machine of claim 16, wherein the channel is aligned with the optical transmitter and the optical receiver when the door is in the locked state.

18. The electronic gaming machine of claim 14, wherein the actuator rotates and optically blocks the optical path from the optical transmitter to the optical receiver when the door is moving away from the locked state to the unlocked state.

19. The electronic gaming machine of claim 18, wherein the channel is not aligned with the optical transmitter and the optical receiver when the door is moving away from the locked state to the unlocked state.

20. The electronic gaming machine of claim 1, wherein the processor is coupled to at least one of a server computer and a gaming system, and wherein the locking assembly is operable to communicate to at least one of the processor, the server computer, and the gaming system, that the door is in the locked state when the optical path is formed, and the unlocked state when the optical path is discontinued.

* * * * *